W. O. LUM.
MOTOR CONTROL SYSTEM.
APPLICATION FILED OCT. 3, 1913.
1,287,714.
Patented Dec. 17, 1918.
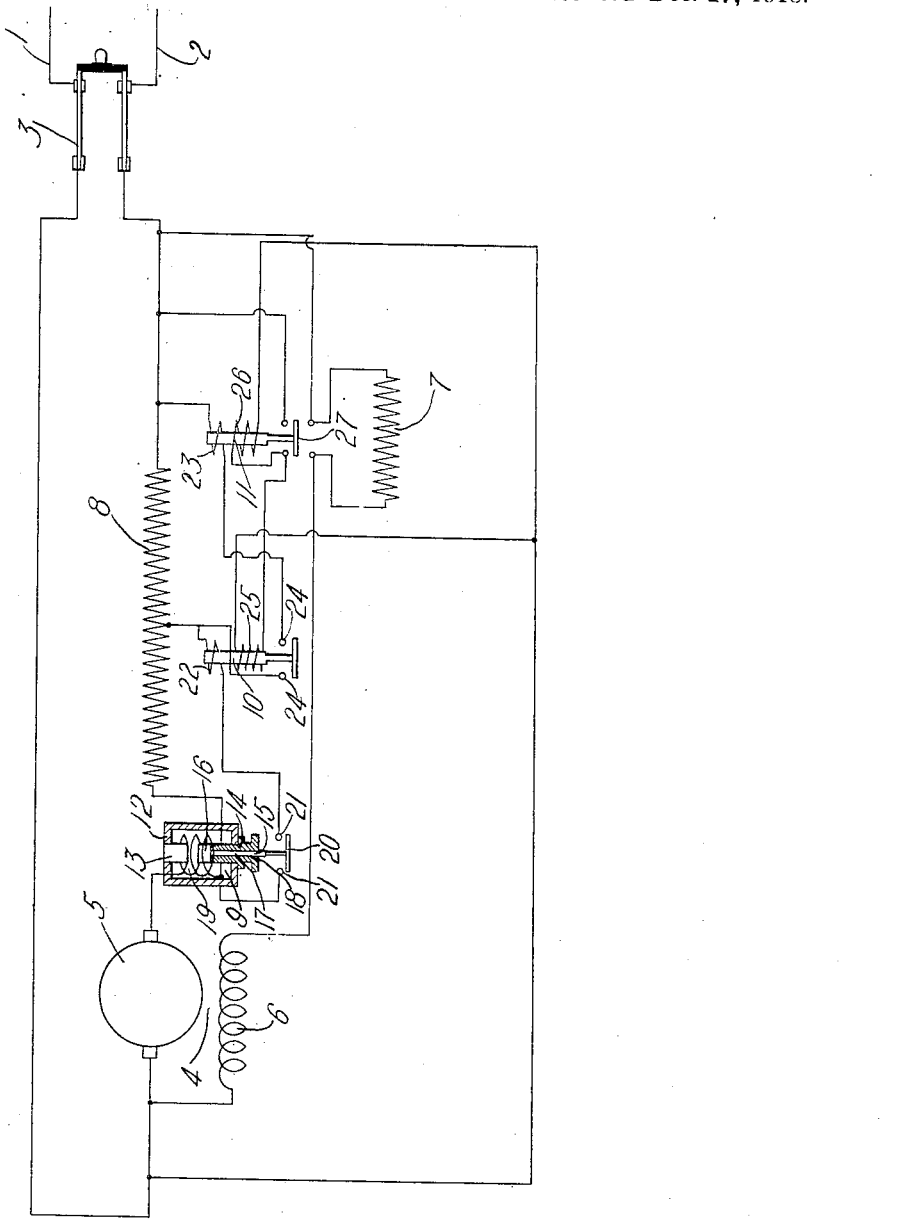
WITNESSES:
Fred A. Lind
J. R. Langley.
INVENTOR
Walter O. Lum
BY
Wesley G. Carr
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,287,714.　　　　　Specification of Letters Patent.　　Patented Dec. 17, 1918.

Application filed October 3, 1913.　Serial No. 793,261.

*To all whom it may concern:*

Be it known that I, WALTER O. LUM, a citizen of the United States, and a resident of Wilkinsburg, in the county of Allegheny and State of Pennsylvania, have invented a new and useful Improvement in Motor-Control Systems, of which the following is a specification.

My invention relates to motor control systems such as may be used in connection with planers, elevators, and similar machines.

My invention has for its object to provide a means whereby the field resistor is automatically controlled, regardless of unusual or abnormal circuit conditions.

In the operation of automatic switches for controling the current and the speed of motors, it sometimes happens that unusual circuit conditions, such as fluctuations in voltage or current values and regeneration, seriously interfere with the normal functions of the switches and thereby produce abnormal operating conditions. For example, the actuating coils of electromagnetic switches must be energized to a certain degree in order to maintain the open or the closed position of the switches, as the case may be. If a short circuit be removed from the starting resistor or completed for the field resistor, the speed of the motor is decreased, although the controller or master switch may be adjusted for full speed. It is essential, therefore, that the automatic switches perform their normal functions regardless of conditions in the motor circuit.

I have provided an arrangement whereby the last switch to operate in short-circuiting the starting resistor breaks a short circuit for the field resistor. A shunt circuit comprises holding coils which hold the last two switches to operate in their respective operative positions regardless of motor circuit conditions.

In the accompanying drawings, the single figure is a diagrammatic view of circuits and apparatus embodying my invention.

Current is supplied from any suitable source through line conductors 1 and 2 and main switch 3 to a motor 4, the armature of which is indicated at 5. The motor is provided with a shunt field winding 6 and a resistor 7 which is adapted to be connected in series with the winding. A sectional starting resistor 8 is controlled by a series of successively actuated switches 9, 10 and 11.

The switch 9, which operates on the lock out principle, comprises a casing member 12 of magnetic material at the upper end of which is fixed a pole piece 13. A tubular member 14, which is adjustably connected to the casing 12 at its lower end, constitutes a second pole piece. A movable core member 15 is provided with an enlarged head 16 and a stem 17 which occupies an opening 18 in the tubular member 14. A series coil 19 surrounds the pole pieces 13 and 14 and the core member 15. When the series coil 19 is energized by an excessive current, the stem 17 becomes saturated magnetically and a flux is produced across the small air gap between the head 16 and the upper end of the tubular pole piece 14. The resultant magnetic attraction between these members is sufficient to hold the movable core member 15 in its lower position. The air gap between the head 16 and the pole piece 13 is also a part of the magnetic circuit and there is, consequently, a magnetic attraction between these two members that tends to draw the core member 15 upwardly. When the current falls to a normal value, flux ceases across the first mentioned air gap because the stem 17 is no longer magnetically saturated. The core member 15 is then drawn upwardly against the force of gravity to cause a switch member 20 to bridge contact members 21.

The switches 10 and 11 are provided with actuating coils 22 and 23 that are in series with the contact members 21 and 24 of the switches 9 and 10, respectively. The switches 10 and 11 are also provided with shunt holding coils 25 and 26 which are connected in parallel across the line and are controlled by the switch 11.

When it is desired to start the motor, the main switch 3 is closed and current is supplied to the motor through a circuit which extends from the line conductor 2 through the switch 3, resistor 8, series coil 19, armature 5 and switch 3 to the line conductor 1. As long as the current exceeds a predetermined value determined by the adjustment of the switch 9, the core member 15 will remain in its lower position, as above described. When the current has fallen to a normal value, the core member 15 is drawn upwardly and the switch member 20 bridges the contact members 21.

A short circuit for one section of the resistor 8 is thereby completed through the actuating coil 22 which is energized to close the switch 10. A short circuit for the remaining section of the resistor 8, which is completed by the closing of the switch 10, comprises the actuating coil 23 of the switch 11. The switch member 27 of the switch 11, when in its lower position, short circuits the field resistor 7 so that the shunt field winding receives full current. When the switch member 27 is drawn upwardly, the short circuit for the resistor 7 is broken, and a circuit is completed through the shunt holding coils 25 and 26. The insertion of the resistor 7 in series with the field winding 6 thus weakens the motor field and the motor speed is correspondingly increased.

This construction insures that the motor cannot be accelerated before the resistance of the armature circuit has been cut out and that acceleration will occur immediately upon that condition having been reached. The holding coils 25 and 26, which are connected across the line, will hold the switches 10 and 11 closed, regardless of conditions in the motor circuit.

I claim as my invention:

1. In a motor-control system, the combination with a motor having an armature winding and a field-magnet winding, and a resistor for each of said windings, of a switch for each of said resistors, one of said switches being normally open to maintain said armature resistor in circuit, and the other of said switches being normally closed to short-circuit said field resistor, an actuating coil for said normally closed switch in series with said armature winding and said other switch, said coil being adapted to be energized upon the closing of said other switch to open said normally closed switch to insert said field resistor into the circuit of said motor, and a holding coil for each of said switches.

2. In a motor-control system, the combination with an electric motor, and a starting resistor and a field resistor therefor, of a plurality of progressively actuated electromagnetic switches for controlling said starting resistor, an electromagnetic switch for controlling said field resistor, each of said switches, except the last to be actuated, being in series with the motor under running conditions, each of said switches, except the first to close, comprising an actuating coil in series with the motor armature and controlled by the preceding switch and a holding coil controlled by the last of said switches to be actuated.

3. In a motor control system, the combination with a motor, of a starting resistor and a field resistor therefor, a plurality of successively actuated electromagnetic switches for controlling the starting resistor, an electromagnetic switch for controlling the field resistor comprising an actuating coil in series with the last of said switches to close, and holding coils for a plurality of the switches in series with the switch for controlling said field resistor.

4. In a motor control system, the combination with an electric motor, and a starting resistor and a field resistor therefor, of a plurality of successively actuated electromagnetic switches for controlling said resistors, each of said switches, except the first to close, comprising a shunt holding coil, the last of said switches to close having two positions, in one of which it closes a shunt circuit for said field resistor, and in the other of which it opens said shunt circuit and closes the circuits of said holding coils.

In testimony whereof I have hereunto subscribed my name this 26th day of Sept., 1913.

WALTER O. LUM.

Witnesses:
C. E. STEPHENS,
B. B. HINES.